US009286539B2

United States Patent
Zharkov (10) Patent No.: US 9,286,539 B2
(45) Date of Patent: Mar. 15, 2016

(54) CONSTRUCTING CONTOURS FROM IMAGERY (71) Applicant: Google Inc., Mountain View, CA (US)

(72) Inventor: Ilya Dmitriyevich Zharkov, Longmont, CO (US)

(73) Assignee: Google Inc., Mountain View, CA (US)

( * ) Notice: Subject to any disclaimer, the term of this patent is extended or adjusted under 35 U.S.C. 154(b) by 250 days.

(21) Appl. No.: 14/177,397

(22) Filed: Feb. 11, 2014

(65) Prior Publication Data

US 2015/0227808 A1　Aug. 13, 2015

(51) Int. Cl.
G06K 9/00　(2006.01)
G06K 9/46　(2006.01)

(52) U.S. Cl.
CPC .......... *G06K 9/4638* (2013.01); *G06K 9/00637* (2013.01)

(58) Field of Classification Search
None
See application file for complete search history.

(56) References Cited

U.S. PATENT DOCUMENTS

| 7,133,551 | B2 * | 11/2006 | Chen ...................... G01C 11/04 345/419 |
| 8,145,578 | B2 * | 3/2012 | Pershing ................ G06Q 10/00 703/2 |
| 8,731,234 | B1 * | 5/2014 | Ciarcia .............. G06K 9/00637 382/100 |
| 2003/0147553 | A1 * | 8/2003 | Chen ...................... G01C 11/04 382/154 |
| 2012/0179431 | A1 * | 7/2012 | Labrie ..................... G06F 17/50 703/1 |

FOREIGN PATENT DOCUMENTS

WO　WO 2009/143986　12/2009

OTHER PUBLICATIONS

Wang, A Robust Approach for Automatic Registration of Aerial Images with Untextured Aerial LiDAR Data, 2009, IEEE Computer Vision and Pattern Recognition, CVPR 2009.*
Nebesov, Edges as Nodes A New Approach to Timetable Information, 2010, Leibniz Universität Hannover Institut für Theoretische Informatik.*
Kim, Development of a graph-based approach for building detection, Image and Vision Computing vol. 17, Issue 1, Jan. 1999, pp. 3-14.*
Shiyong Cui, Complex building description and extraction based on Hough transformation and cycle detection, Remote Sensing Letters vol. 3, Issue 2, 2012.*
Jaynes, Task Driven Perceptual Organization for Extraction of Rooftop Polygons, IEEE Applications of Computer Vision, 1994.*

(Continued)

*Primary Examiner* — Ming Hon
*Assistant Examiner* — Phuc Doan
(74) *Attorney, Agent, or Firm* — Dority & Manning, P.A.

(57) ABSTRACT

Systems and methods for identifying contours of objects depicted in imagery are provided. A contour of an occluded object can be reconstructed based on a source contour extracted from an image and/or other geographic data. The source contour can be analyzed to identify a main contour direction for one or more points on the source contour. A plurality of rays can be extended from each of the one or more points based on the main contour direction associated with the point. A graph model can be constructed from the plurality of rays extended from the plurality of points. A path can be determined through the graph model and the contour can be constructed based at least in part on the determined path.

13 Claims, 6 Drawing Sheets

(56) References Cited

OTHER PUBLICATIONS

Fischer et al., "Extracting Buildings from Aerial Images Using Hierarchical Aggregation in 2D and 3D", 5th European Conference on Computer Vision and Image Understanding, Freiburg, Germany, Jun. 2-6, 1998, 30 pages.

Sohn et al., "Data Fusion of High-Resolution Satellite Imagery and LiDAR Data for Automatic Building Extraction", ISPRS Journal of Photogrammetry and Remote Sensing, vol. 62, 2007, pp. 43-63.

* cited by examiner

CONSTRUCTING CONTOURS FROM IMAGERY

FIELD

The present disclosure relates generally to image processing, and more particularly to constructing contours for objects depicted in an image.

BACKGROUND

Geographic information systems can provide for the archiving, retrieving, and manipulating of data that has been stored and indexed according to geographic coordinates of its elements. A geographic information system generally includes a variety of data types, including imagery, maps, tables, vector data (e.g. vector representations of roads, parcels, buildings, etc.), three-dimensional models, and other data. Geographic information system can allow for the navigating and displaying of geographic imagery, such as map imagery, satellite imagery, aerial imagery, panoramic imagery, three-dimensional models, and other geographic imagery. Users can use a geographic information system to search for, view, receive travel directions to, and otherwise navigate a particular point of interest.

Geographic information systems can provide aerial views of a geographic area. The aerial views can provide oblique or nadir perspectives of the geographic area. In certain cases, the aerial views can be associated with three-dimensional data, such as a three-dimensional model. The three-dimensional model can include a polygon mesh constructed from imagery captured of the geographic area. Images of the geographic area can be texture mapped to the polygon mesh to provide a realistic representation of the geographic area. Aerial imagery provided by the geographic information system can depicts objects such as buildings in the aerial imagery. The geographic information system can depict contours or other representations (e.g. vector representations) of the objects in the aerial imagery to facilitate the identification of the objects in the aerial imagery.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of identifying a contour for an object depicted in an image. The method includes determining, by one or more computing devices, a contour direction for a point on a source contour for the object and determining, by the one or more computing devices, a plurality of rays extending from the point on the source contour based at least in part on the contour direction. The method further includes constructing, by the one or more computing devices, a graph model based at least in part on the plurality of rays. The method further includes constructing, by the one or more computing devices, a contour for the object based at least in part on a path through the graph model.

Other aspects of the present disclosure are directed to systems, apparatus, tangible, non-transitory computer-readable media, user interfaces, memory devices, and electronic devices for identifying a contour for an object depicted in an image.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Generally, example aspects of the present disclosure are directed to identifying contours for objects from imagery, such as an aerial image of a geographic area. Contours (e.g. outer perimeters) for objects, such as buildings, can be used for a variety of purposes, such as constructing three-dimensional models of the objects and/or for presenting the contours in conjunction with imagery (e.g. map imagery) to facilitate identification of the objects. One of the problems in generating contours from images is the occlusion of parts of the objects by other objects in the imagery. For instance, trees and other vegetation can occlude portions of buildings depicted in geographic imagery. Often trees can cover one or more corners of a building so that some guess has to be made about the true contour of the building depicted in the geographic image to identify the contour of the building.

Existing approaches for identifying contours for objects such as buildings can include the use of various contour simplification algorithms. For instance, a source contour of an object can be extracted from the imagery using image analysis techniques. The best points on the source contour can be selected to create an estimated contour for the object. Other approaches consider all points on the source contour as potential corners. This naïve approach can become cumbersome for complex contours. Another approach can access a predefined set of template contours for the object and try to match them to a given source contour or image. This approach can work well for simple shapes but can require a prohibitively large number of templates for complex cases.

According to example aspects of the present disclosure, a contour of an occluded object can be identified based on a source contour extracted from an image and/or other geographic data. The source contour can include the initial source contour for the object identified from the image and/or other geographic data (e.g. a three-dimensional data) using various contour identification or image analysis techniques. The initial source contour can have various artifacts resulting from, for instance, occlusion by other objects depicted in the image. The contour identification process according to example aspects of the present disclosure can test points located on the initial contour to reconstruct parts of the initial source contour that were occluded by objects in the image.

For example, an aerial image of a geographic area can be analyzed to identify an approximate initial source contour for a building depicted in the aerial image. The initial source contour can include artifacts or missing portions resulting from occlusion of the building by, for instance, tress or other vegetation in the aerial image. The initial source contour can be reconstructed to identify a more accurate contour for the building that more closely approximates the true shape of the building. The identified contour can then be used for a variety of purposes, such as for display in conjunction with geographic imagery presented in a geographic information system or for constructing a three-dimensional model or vector representation of the building.

According to a particular example implementation of the present disclosure, a source contour associated with a building or other object can be identified from an aerial image and/or other geographic data using image analysis techniques. The source contour can be analyzed to identify a main contour direction for one or more points on the source contour using, for instance, line extraction techniques or other suitable techniques. A plurality of rays can be extended from each of the one or more points based on the main contour direction associated with the point. For instance, a first ray extending in a direction parallel to the main contour direction can be extended from each of the one or more points on the source contour and a second ray extending in a direction orthogonal to the main contour direction can be extended from each of the one or more points on the source contour.

A graph model can be constructed from the plurality of rays determined to extend from the plurality of points. The graph model can include a plurality of nodes with each node associated with one of the plurality of rays. The graph model can further include a plurality of edges interconnecting the nodes. Each edge can be associated with an intersection of two of the plurality of rays associated with the source contour. Edge weights can be determined for the plurality of edges based at least in part on the location of the intersection relative to the source contour as well as other factors such as an area between the rays and the source contour and/or an angle defined by the plurality of rays at the intersection.

A path can be identified through the graph model. For instance, a shortest path algorithm can be used to find a shortest path through the graph model. In one particular embodiment, each node can be tested as a starting node and a cyclic path through the graph model to return to the starting node can be identified. The shortest of these cyclic paths can be identified as the shortest path. The contour for the building can be identified based at least in part on the identified shortest path. For instance, rays and intersections associated with nodes and edges in the shortest path can be used to construct the contour.

Example aspects of the present disclosure will be discussed with reference to identifying a contour for a building at least partially occluded by vegetation for purposes of illustration and discussion. Those of ordinary skill in the art, using the disclosures provided herein, will understand that example aspects of the present disclosure can be used for identifying contours for other objects depicted in imagery without deviating from the scope of the present disclosure.

Example Identification of a Building Contour

Figure 1:
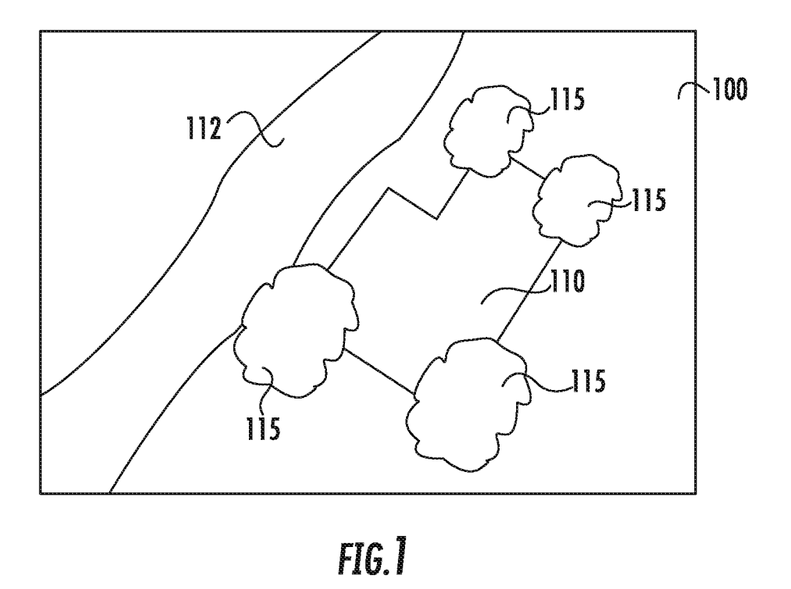
FIG. 1 depicts an example geographic image depicting a building partially occluded by vegetation.

FIG. 1 depicts an example aerial image 100 captured of a geographic area. The aerial image 100 can be captured from a nadir or oblique perspective relative to the geographic area. For instance, the aerial image 100 can be captured by a camera mounted to an aircraft as the aircraft flies over the geographic area. The aerial image 100 depicts various objects, including a building 110, a road 112, and vegetation 115 such as trees. As shown, the vegetation 115 can occlude at least a portion of the building 110 in the aerial image 100.

In particular embodiments, the aerial image 100 can be associated with three-dimensional data providing the location of surfaces of objects depicted in the aerial image 100, such as a three-dimensional model of the geographic area depicted in the aerial image 100. For instance, three-dimensional data associated with the geographic area can be generated from a plurality of aerial images captured of the geographic area. The aerial images can be taken by overhead cameras, such as from an aircraft, at various oblique or nadir perspectives. In the imagery, features can be detected and correlated with one another. The points can be used to determine a stereo mesh from the imagery. In this way, three-dimensional data can be determined from two-dimensional imagery. The three-dimensional data can be represented by any suitable representation or collection of data that is indicative of the location of the surfaces in the geographic area. For instance, the three-dimensional data can be represented as a depth map, height field, closed mesh, signed distance field, or any other suitable type of representation.

In many instances, it can be desirable to construct a contour of the objects depicted in the aerial image 100. For instance, a contour for the building 110 can be used for a variety of purposes, such as constructing a more accurate three-dimensional model of the building, constructing a vector representation of the building, for use in a display of a representation of the geographic area in a geographic information system, or for other suitable purposes. The contour of the building 110 can refer to the outer or external perimeter of the building when viewed from a given perspective, such as from a nadir or aerial perspective.

Figure 2:
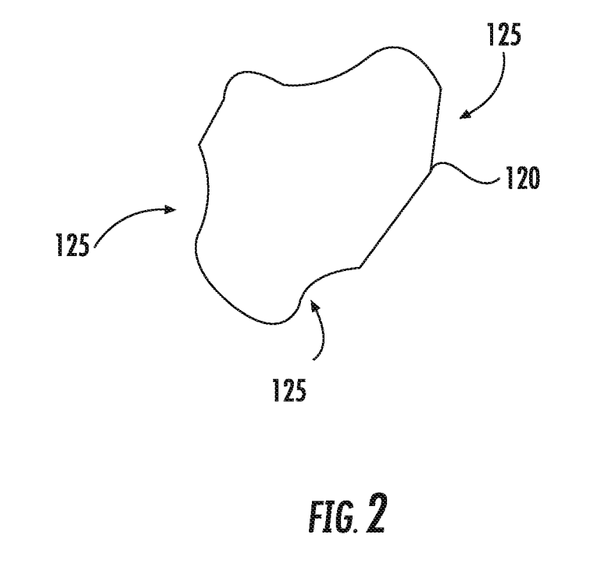
FIG. 2 depicts a source contour for the building extracted from the geographic image according to example aspects of the present disclosure.

FIG. 2 depicts an example initial source contour 120 for the building 110 that can be extracted from the aerial image 100 and/or three-dimensional data indicative of surfaces in the image 100. For instance, image analysis techniques can be used to identify and extract the source contour 120. As shown in FIG. 2, the source contour 120 can be a rough approximation of the true contour of the building 110. For instance, the source contour can include artifacts 125 that deviate from the true shape of the contour of the building 110. The artifacts 125 can result from, for instance, the occlusion of portions of the building 110 by vegetation.

Figure 3:
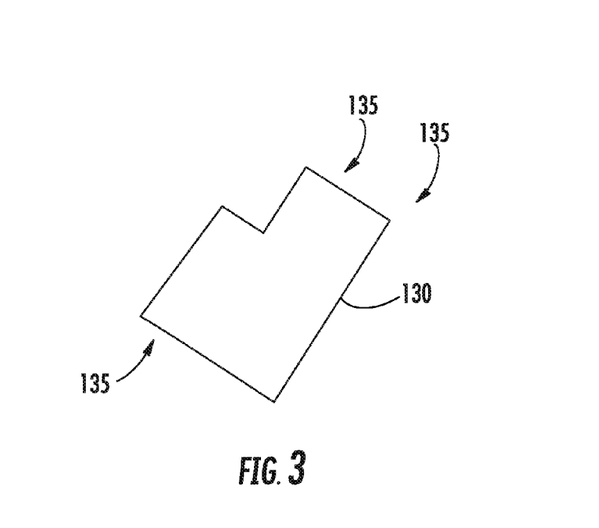
FIG. 3 depicts a contour for a building identified according to example aspects of the present disclosure.

According to example aspects of the present disclosure, the initial source contour 120 can be processed to identify a contour that is more representative of the true outer perimeter of the building 110. For instance, the source contour 120 can be processed to identify the contour 130 depicted in FIG. 3. The contour 130 has corners 135 that provide a more true approximation of the outer perimeter of the building 110. These corners 135 are generated notwithstanding the occlusion of portions of the building 110 by vegetation in the image 100. Example processing techniques for identifying the contour 130 from a source contour 120 will be discussed in more detail below.

Figure 4:
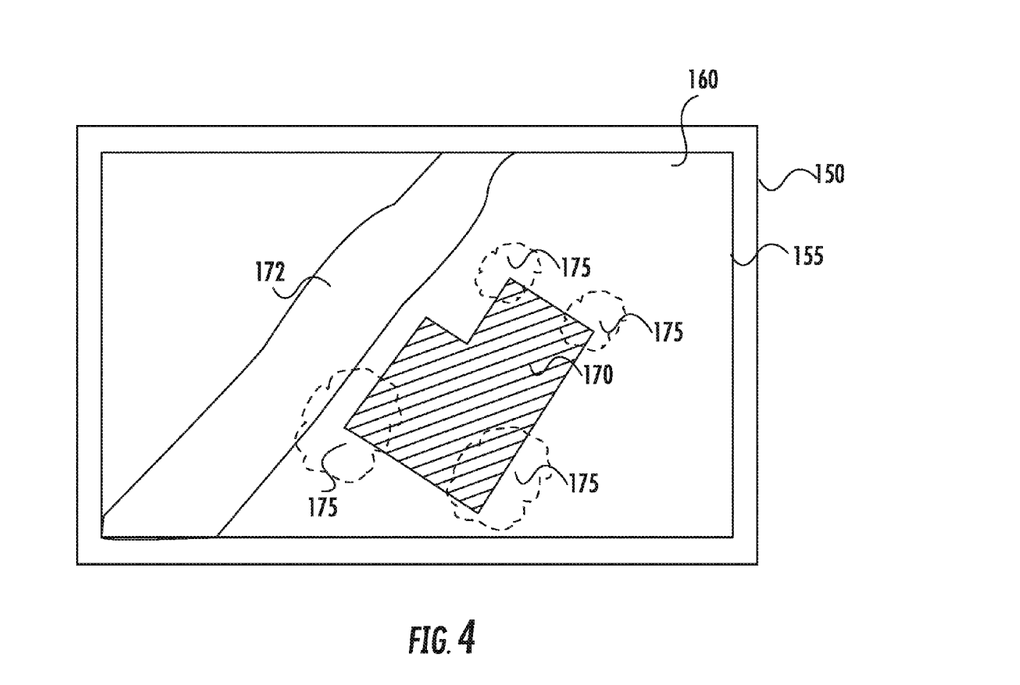
FIG. 4 depicts an example user interface of a geographic information system providing for display geographic imagery including the identified contour.

The identified contour 130 can be used for a variety of purposes. For instance, FIG. 4 depicts a graphical user interface of geographic information system presented on a display 155 of a computing device 150, such as a tablet, smartphone, mobile phone, laptop, desktop, wearable computing device, smart television, a display with one or more processors or other suitable computing device 150. The graphical user interface can display aerial imagery 160. The aerial imagery 160 can include a representation 172 of the road 112 as well as a representation 170 of the building 110 and representations 175 of vegetation. The representation 170 of the building can be, for instance, a vector representation of the building 110. The representation 170 can be generated based at least in part on the identified contour 130 of FIG. 3. The representation 170 of FIG. 4 provides a more accurate representation of the shape of the building 110 in the aerial imagery 160, facilitating the identification of the building by a user of the geographic information system.

Example Methods for Constructing a Building Contour from an Image

Figure 5:
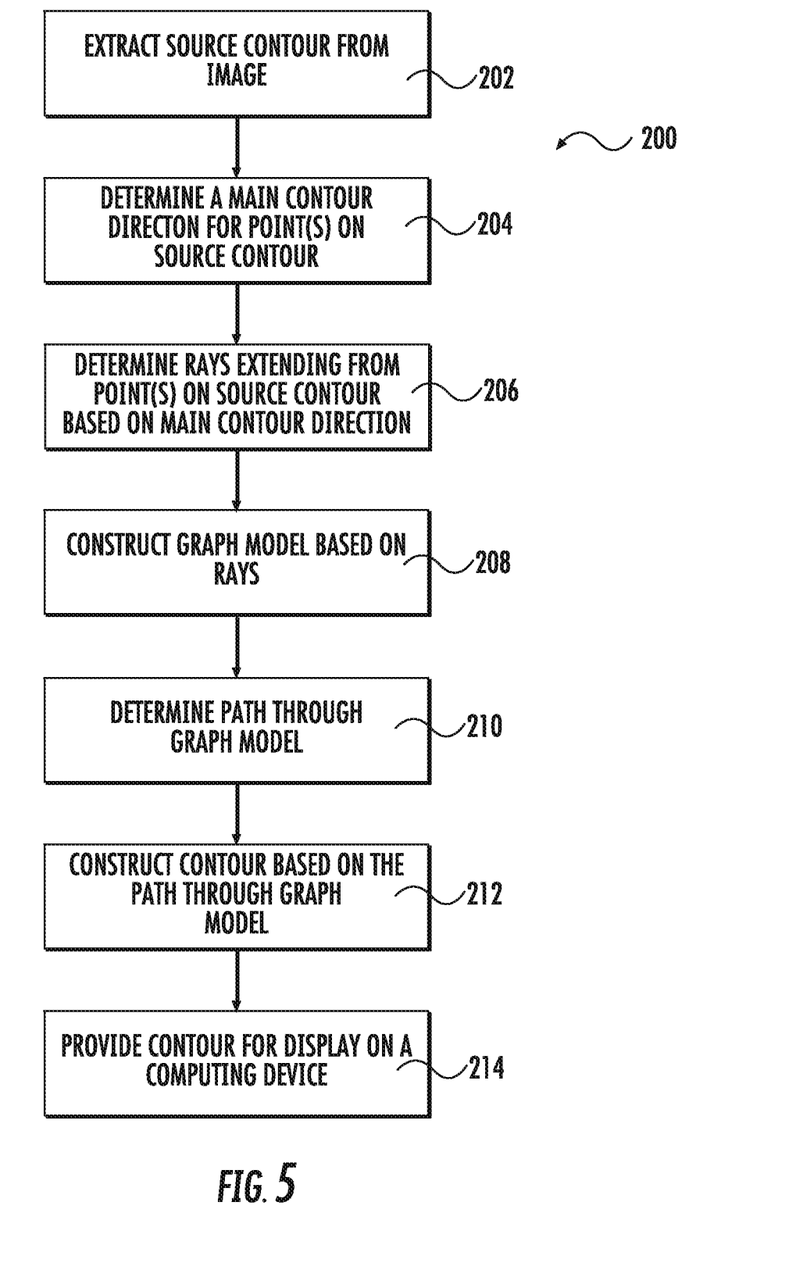
FIG. 5 depicts a process flow diagram of an example method for identifying a contour for an object depicted in an image according to example aspects of the present disclosure.

FIG. 5 depicts a process flow diagram of an example method (200) for identifying a contour associated with an object depicted in an image according to example aspects of the present disclosure. The method (200) can be implemented by one or more computing devices, such as one or more of the computing devices depicted in FIG. 10. In addition, FIG. 5 depicts steps performed in a particular order for purposes of illustration and discussion. Those of ordinary skill in the art, using the disclosures provided, will understand that the various steps of any of the methods disclosed herein can be modified, adapted, omitted, rearranged, or expanded in various ways without deviating from the scope of the present disclosure.

At (202), an initial source contour is extracted from an image. For instance, image processing techniques can be performed on the image to identify a contour or outer perimeter associated with an object, such as a building, depicted in the image. FIG. 2 depicts an example source contour 120 extracted from the image 100 of FIG. 1. The initial source contour can be extracted using a variety of image processing/image analysis techniques, such as feature detection techniques, line extraction techniques, shape identification techniques, and other suitable techniques.

In one particular implementation, the source contour for a building can be extracted based at least in part on the image and three-dimensional data associated with the image. The source contour can be extracted, for instance, by searching the image and the three-dimensional data to identify a building-like structure. Red and infrared channels of the aerial image can be filtered to remove data associated with vegetation. Connected components (or islands) of elevated areas without vegetation can then be extracted to identify the source contour.

Figure 6:
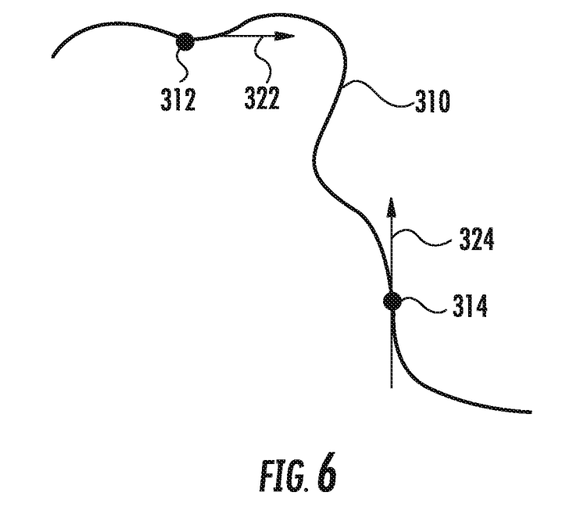
FIG. 6 depicts an example source contour with identified main contour directions according to example aspects of the present disclosure.

Referring back to FIG. 5 at (204), a main contour direction is identified for one or more points on the source contour. The main contour direction refers to a direction generally following the direction of the source contour at a particular point on the source contour. FIG. 6 depicts a portion of an example source contour 310 with identified main contour directions 322 and 324 for selected points on the source contour 310. More particularly, a main contour direction 322 can be identified for first point 312. Similarly, a main contour direction 324 can be identified for second point 314. Various processing techniques can be used for identifying a main contour direction for a point. For instance, a Hough transform or a Radon transform can be used to extra a line segment generally following the source contour at a point. The direction associated with the extracted line segment can be the main contour direction.

In another example embodiment, the main contour direction can be identified using a searching algorithm that searches a plurality of candidate main contour directions in stepped increments (e.g. 0.1 degrees in each step) from 0 to 90 degrees. For each candidate direction, all points can be projected to a vertical axis and a horizontal axis with buckets equal to one pixel width. A moving average can be applied to values in the buckets to account for noise. A score determined based on the sum of the squared values of the number of points in buckets can be determined and associated with each candidate direction. The angle that has the highest score can be selected as the main contour direction. If several main contour directions are needed, the search algorithm can look for a plurality of local optima in the range of 0 to 90 degrees with the local optima being separated by a threshold distance (e.g. number of degrees).

In this example embodiment, the projection to both the vertical and horizontal axis in determining the score accounts for the fact that for each building wall there is usually a wall orthogonal to it. In particular example implementations, a non-linear operation can be performed on the bucket values (or the squared bucket values). Otherwise, the score may become constant among the angles and meaningless in identifying the main contour direction.

Referring back to FIG. 5 at (206), the method includes determining a plurality of rays extending from the one or more points on the source contour based at least in part on the main contour direction identified for the respective points. For instance, a first ray can be determined to extend from each point in a direction parallel to the main contour direction for the point. A second ray can be determined to extend from each point in a direction orthogonal to the main contour direction for the point.

Figure 7:
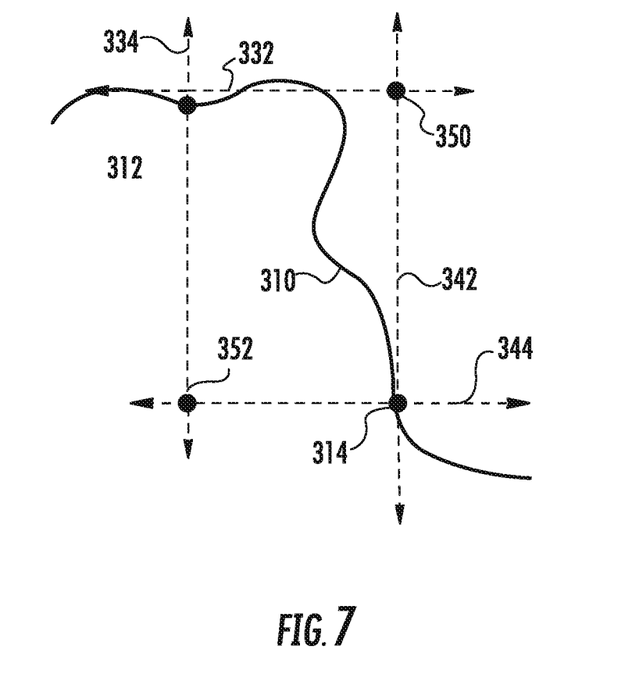
FIG. 7 depicts example rays extending from points on the source contour according to example aspects of the present disclosure.

FIG. 7 depicts a plurality of rays determined to extend from points on a portion of the source contour 310 according to an example embodiment of the present disclosure. More particularly, a first ray 332 is determined to extend from the first point 312 in a direction parallel to the main contour direction 322 (FIG. 6). A second ray 334 is determined to extend from the first point 312 in a direction orthogonal to the main contour direction 322 (FIG. 6). Similarly, a first ray 342 is determined to extend from the second point 314 in a direction parallel to the main contour direction 324 (FIG. 6). A second ray 344 is determined to extend from the second point 312 in a direction orthogonal to the main contour direction 324 (FIG. 6). As shown in FIG. 7, first ray 332 and first ray 342 intersect at intersection 350. Second ray 334 and second ray 344 intersect at intersection 352.

Referring back to FIG. 5 at (208), a graph model can be constructed based on the determined rays. More particularly, the method can include constructing a graph model having a plurality of nodes and edges. The plurality of nodes can be constructed based at least in part on the plurality of determined rays. Each node can represent one of the plurality of rays. The plurality of edges can interconnect one or more of the plurality of nodes. Each edge can represent an intersection between a plurality of rays. For instance, an edge can connect the nodes in the graph model associated with the rays that intersect.

Figure 8:
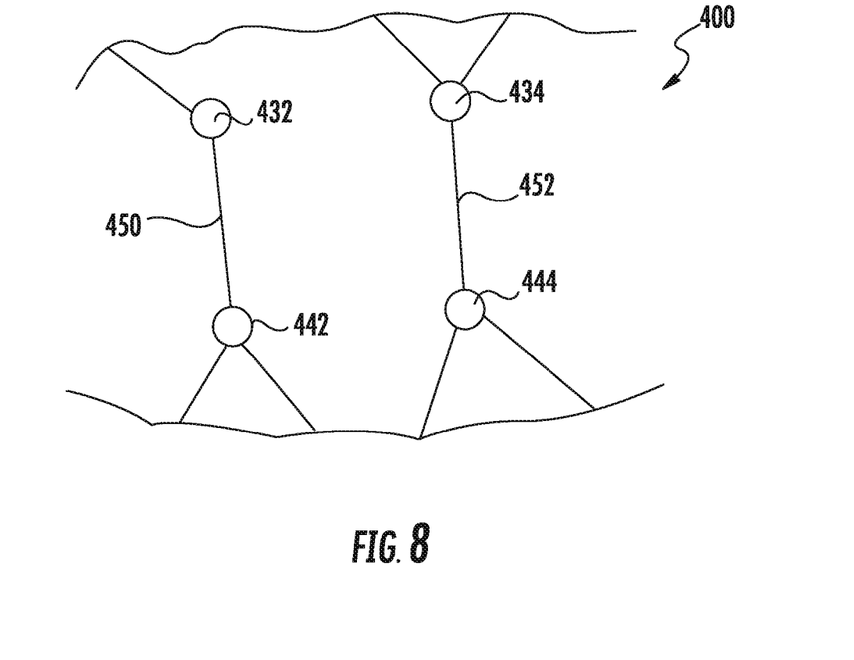
FIG. 8 depicts an example graph model constructed according to example aspects of the present disclosure.

FIG. 8 depicts a portion of a graph model 400 constructed according to example embodiments of the present disclosure. The graph model 400 includes node 432 associated with first ray 332 (FIG. 7) and node 442 associated with first ray 342 (FIG. 7). The edge 450 interconnects node 432 and node 442 and can be associated with intersection 350 (FIG. 7). The graph model 400 further includes node 434 associated with second ray 334 (FIG. 7) and node 443 associated with second ray 344. The edge 452 interconnects node 434 and node 444 and can be associated with intersection 352 (FIG. 7). The nodes 432, 434, 442, and 444 can be interconnected with other nodes (not shown) representative of other rays determined from the source contour.

Figure 9:
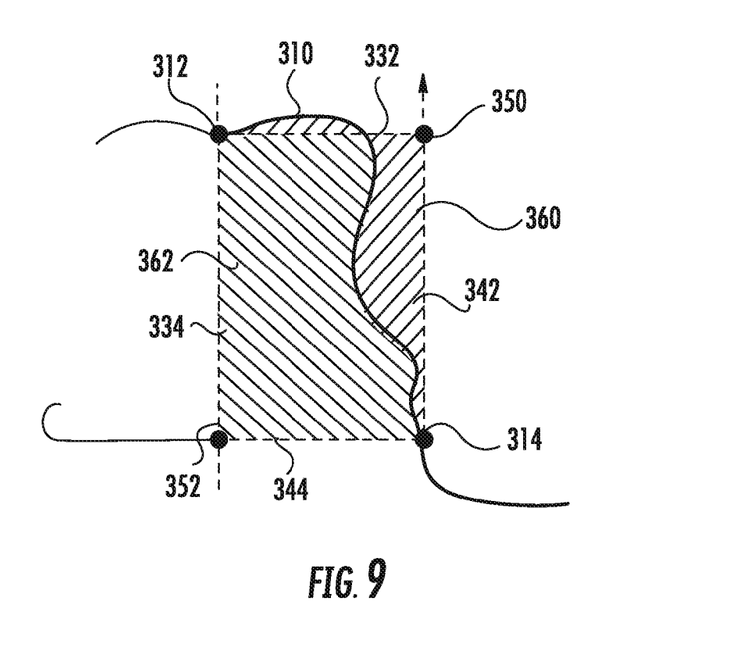
FIG. 9 depicts an area between a plurality of rays and a source contour used in determining an edge weight for the graph model according to example aspects of the present disclosure.

The edges of the graph model can have edge weights determined based on a variety of factors. In one implementation, the edge weights can be determined based at least in part on the location of the intersection represented by the edge to the source contour. For instance, higher edge weights can be provided for intersections that are further away from the source contour. Lower edge weights can be provided for intersections that are closer to the source contour The edge weight can also be determined based at least in part on an area between the intersecting rays and the source contour. More particularly, FIG. 9 depicts an area 360 between intersecting rays 332 and 342 and the source contour 310. The edge weight associated with the edge 450 (FIG. 8) can be determined based at least in part on this area. Similarly, FIG. 9 also depicts an area 362 between intersecting rays 334 and 344 and the source contour 310. An edge weight associated with edge 452 (FIG. 8) can be determined based at least in part on this area 362. In one particular example, the edge 452 can have a greater edge weight than edge 450 because the area 362 associated with edge 452 is greater than the area 360 associated with edge 450.

The edge weights can also be determined based at least in part on other factors. For instance, the edge weights can be determined based at least in part on the angle of the intersection associated with the edge. Sharper edges can be associated with higher edge weights. Orthogonal angles can be associated with lower edge weights. The edge weights can also be determined based on the number of corners associated with an intersection. As an example, intersections leading to more corners for the identified contour can be associated with higher edge weights.

Referring back to FIG. 5 at (210), a path through the graph model can be determined. For instance, a shortest path algorithm (e.g. Dijkstra's algorithm) can be used to determine a shortest path through the graph model, for instance, based on the edge weights associated with edges in the graph model. In one particular implementation, a shortest cyclic path is determined for all possible nodes of the graph model. The shortest cyclic path is the path from a starting node through the graph model to itself. The shortest of the cyclic paths determined for the nodes can be identified as the shortest path through the graph model.

At (212), the method can include constructing the contour based on the path through the graph model. For instance, the contour can be constructed from the rays and intersections associated with the nodes and edges in the path. The identified contour can approximate the true contour of the object, notwithstanding occlusions of the object depicted in the image. Once the contour has been constructed, the contour can be used for a variety of purposes. For example, the contour can be provided for display on a computing device (214).

Example Computing Systems for Constructing a Building Contour from an Image

Figure 10:
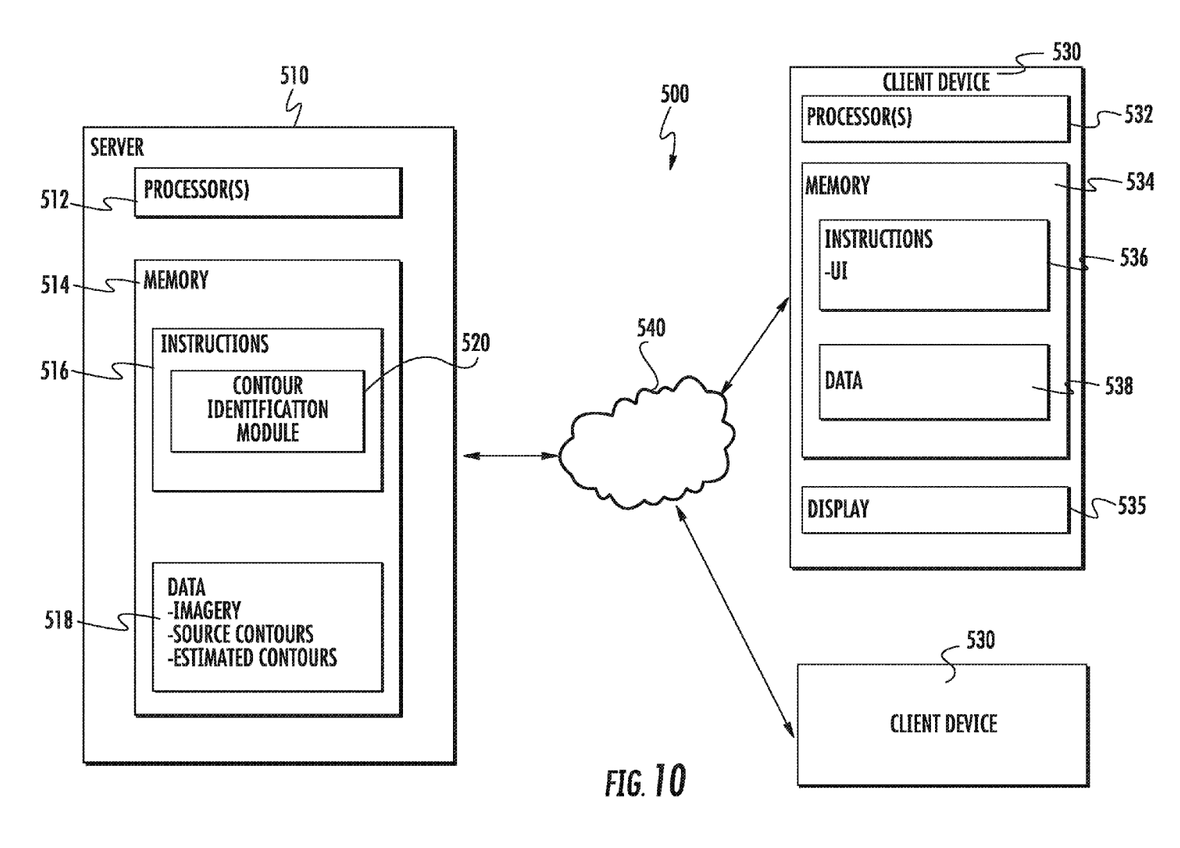
FIG. 10 depicts an example computing system for identifying contour for an object depicted in an image according to example aspects of the present disclosure

FIG. 10 depicts a computing system 500 that can be used to implement the methods and systems according to example aspects of the present disclosure. The system 500 can be implemented using a client-server architecture that includes a server 510 that communicates with one or more client devices 530 over a network 540. The system 500 can be implemented using other suitable architectures, such as a single computing device.

The system 500 includes a server 510, such as a web server. The server 510 can host a geographic information system. The server 510 can be implemented using any suitable computing device(s). The server 510 can have one or more processors 512 and memory 514. The server 510 can also include a network interface used to communicate with one or more client devices 530 over the network 540. The network interface can include any suitable components for interfacing with one more networks, including for example, transmitters, receivers, ports, controllers, antennas, or other suitable components.

The one or more processors 512 can include any suitable processing device, such as a microprocessor, microcontroller, integrated circuit, logic device, or other suitable processing device. The memory 514 can include one or more computer-readable media, including, but not limited to, non-transitory computer-readable media, RAM, ROM, hard drives, flash drives, or other memory devices. The memory 514 can store information accessible by the one or more processors 512, including computer-readable instructions 516 that can be executed by the one or more processors 512. The instructions 516 can be any set of instructions that when executed by the one or more processors 512, cause the one or more processors 512 to perform operations. For instance, the instructions 516 can be executed by the one or more processors 512 to implement one or more modules, such as a contour identification module 520. The contour identification module 520 can implement one or more of the methods disclosed herein (e.g. the method (200) of FIG. 5) to identify a contour for an object, such as a building, depicted in an image.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, hard disk or optical or magnetic media. When software is used, any suitable programming language or platform can be used to implement the module.

Memory 514 can also include data 518 that can be retrieved, manipulated, created, or stored by the one or more processors 512. The data 518 can include, for instance, imagery, source contours, and contours identified according to example aspects of the present disclosure. The data 518 can be stored in one or more databases. The one or more databases can be connected to the server 510 by a high bandwidth LAN or WAN, or can also be connected to server 510 through network 540. The one or more databases can be split up so that they are located in multiple locales.

The server 510 can exchange data with one or more client devices 530 over the network 540. Although two client devices 530 are illustrated in FIG. 10, any number of client devices 530 can be connected to the server 510 over the network 540. Each of the client devices 530 can be any suitable type of computing device, such as a general purpose computer, special purpose computer, laptop, desktop, mobile device, smartphone, tablet, wearable computing device, a display with one or more processors, or other suitable computing device.

Similar to the server 510, a client device 530 can include one or more processor(s) 532 and a memory 534. The one or more processor(s) 532 can include one or more central processing units (CPUs), graphics processing units (GPUs) dedicated to efficiently rendering images or performing other specialized calculations, and/or other processing devices. The memory 534 can include one or more computer-readable media and can store information accessible by the one or more processors 532, including instructions 536 that can be executed by the one or more processors 532 and data 538. For instance, the memory 534 can store instructions 536 for implementing a user interface module and a renderer module for presenting interactive imagery of a geographic area to a user. The interactive imagery can include contours constructed according to example aspects of the present disclosure.

The client device 530 of FIG. 10 can include various input/output devices for providing and receiving information from a user, such as a touch screen, touch pad, data entry keys, speakers, and/or a microphone suitable for voice recognition. For instance, the client device 530 can have a display 535 for presenting geographic imagery of a geographic area to a user.

The client device 530 can also include a network interface used to communicate with one or more remote computing devices (e.g. server 510) over the network 540. The network interface can include any suitable components for interfacing with one more networks, including for example, transmitters, receivers, ports, controllers, antennas, or other suitable components.

The network 540 can be any type of communications network, such as a local area network (e.g. intranet), wide area network (e.g. Internet), cellular network, or some combination thereof. The network 540 can also include a direct connection between a client device 530 and the server 510. In general, communication between the server 510 and a client device 530 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of identifying a contour for an object depicted in an image, the method comprising:

determining, by one or more computing devices, a contour direction for a point on a source contour for the object;

determining, by the one or more computing devices, a plurality of rays extending from the point on the source contour based at least in part on the contour direction;

constructing, by the one or more computing devices, a graph model based at least in part on the plurality of rays; and constructing, by the one or more computing devices, a contour based at least in part on a path through the graph model;

wherein the contour is constructed notwithstanding one or more occlusions of the object depicted in the image;

wherein constructing, by the one or more computing devices, a graph model based at least in part on the plurality of rays comprises:

constructing, by the one or more computing devices, a plurality of nodes of the graph model, each of the plurality of nodes representing one of the plurality of rays; and constructing, by the one or more computing devices, a plurality of edges interconnecting the nodes in the graph model, each of the plurality of edges representing an intersection between the plurality of rays; and wherein constructing, by the one or more computing devices, the graph model comprises determining, by the one or more computing devices, an edge weight for each of the plurality of edges in the graph model based at least in part on an area between the rays associated with the nodes interconnected by the edge and the source contour.

2. The computer-implemented method of claim 1, wherein the source contour is identified from an aerial image captured of a geographic area, the source contour associated with a building depicted in the aerial image, the building at least partially occluded by vegetation depicted in the aerial image.

3. The computer-implemented method of claim 1, wherein the contour direction for the point on the source contour is identified using a Hough transform or a Radon transform.

4. The computer-implemented method of claim 1, wherein determining, by the one or more computing devices, the plurality of rays extending from the point on the source contour based at least in part on the contour direction comprises:

determining, by the one or more computing devices, a first ray extending from the point in a direction parallel to the contour direction; and determining, by the one or more computing devices, a second ray extending from the point in a direction orthogonal to the contour direction.

5. The computer-implemented method of claim 1, wherein the edge weight is determined, by the one or more computing devices, based at least in part on an angle defined by the rays associated with the nodes interconnected by the edge.

6. The computer-implemented method of claim 1, wherein the edge weight is determined, by the one or more computing devices, based at least in part on a number of corners determined for the contour generated based on the edge.

7. The computer-implemented method of claim 1, wherein constructing, by the one or more computing devices, the contour based at least in part on a path through the graph model comprises:

determining, by the one or more computing devices, a plurality of cyclic paths in the graph model, each of the plurality of cyclic paths providing a path starting at one of the plurality of nodes and returning to the same node; and selecting, by the one or more computing devices, a shortest of the plurality of cyclic paths as the path through the graph model.

8. The computer-implemented method of claim 7, wherein constructing, by the one or more computing devices, the contour based at least in part on the shortest path through the graph model comprises constructing the contour based at least in part on the rays associated with at least one of the plurality of nodes in the shortest path through the graph model.

9. The computer-implemented method of claim 1, wherein the method comprises providing, by the one or more computing devices, the contour for display on a display device.

10. A computing system, comprising:
one or more processors; and
one or more memory devices storing computer-readable instructions that when executed by the one or more processors cause the one or more processors to perform operations for constructing a contour for an object depicted in an image, the operations comprising:
identifying a source contour for the object from the image;
determining a contour direction for a point on the source contour for the object;
determining a plurality of rays extending from the point on the source contour based at least in part on the contour direction;
constructing a graph model based at least in part on the plurality of rays, the graph model comprising a plurality of nodes, each node associated with one of the plurality of rays, the graph model further comprising at least one edge interconnecting the plurality of nodes, the at least one edge associated with an intersection between the plurality of rays; and constructing a contour based at least in part on a shortest path through the graph model;
wherein the contour is reconstructed notwithstanding one or more occlusions of the object depicted in the image;
wherein the operation of constructing the graph model comprises determining an edge weight for each of the plurality of edges in the graph model based at least in part on an area between the rays associated with the nodes interconnected by the edge and the source contour.

11. The computing system of claim 9, wherein the operation of determining the plurality of rays extending from the point on the source contour based at least in part on the contour direction comprises:
determining a first ray extending from the point in a direction parallel to the contour direction; and
determining a second ray extending from the point in a direction orthogonal to the contour direction.

12. One or more tangible, non-transitory computer-readable media storing computer-readable instructions that when executed by one or more processors cause the one or more processors to perform operations for constructing a contour of a building from an aerial image, the operations comprising:
identifying a source contour for the building from the image;
determining a contour direction for a point on a source contour for the building;
determining a plurality of rays extending from the point on the source contour based at least in part on the contour direction;
constructing a graph model based at least in part on the plurality of rays;
constructing a contour for the building based at least in part on a shortest path through the graph model; and
providing the contour for the building for display on a display device;
wherein the contour is constructed notwithstanding one or more occlusions of the object depicted in the image;
wherein constructing a graph model based at least in part on the plurality of rays comprises:
constructing a plurality of nodes of the graph model, each of the plurality of nodes representing one of the plurality of rays; and
constructing a plurality of edges interconnecting the nodes in the graph model, each of the plurality of edges representing an intersection between the plurality of rays; and
wherein constructing the graph model comprises determining an edge weight for each of the plurality of edges in the graph model based at least in part on an area between the rays associated with the nodes interconnected by the edge and the source contour.

13. The one or more tangible, non-transitory computer-readable media of claim 12, wherein the one or more occlusions of the building depicted in the image are associated with vegetation depicted in the image.

* * * * *